E. N. BOTSFORD.
DERAILMENT AIR BRAKE.
APPLICATION FILED APR. 1, 1911.
1,019,751.
Patented Mar. 12, 1912.
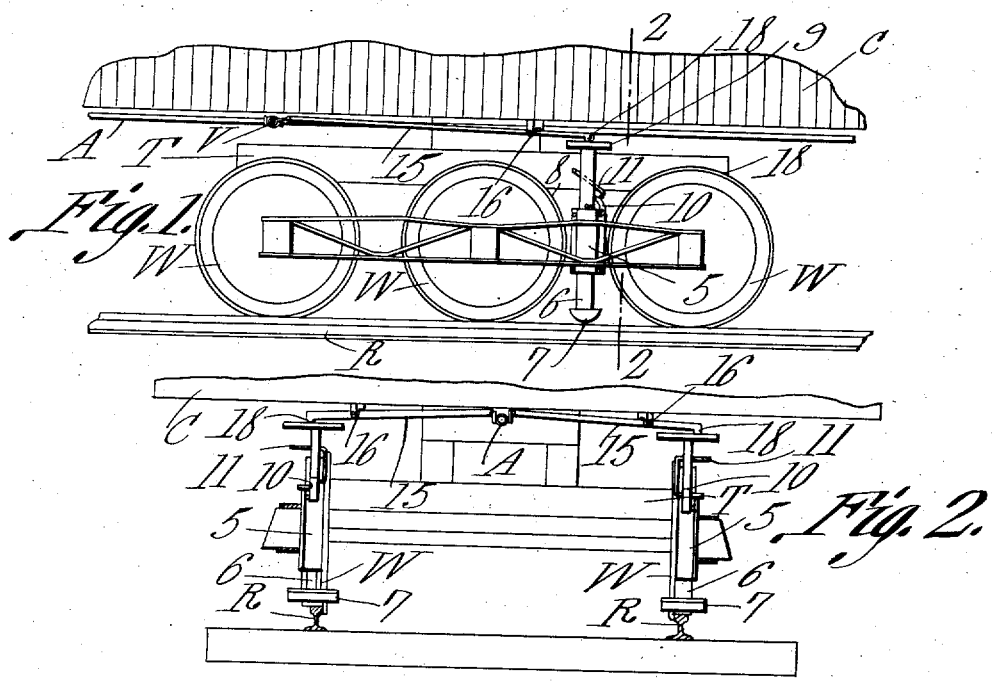
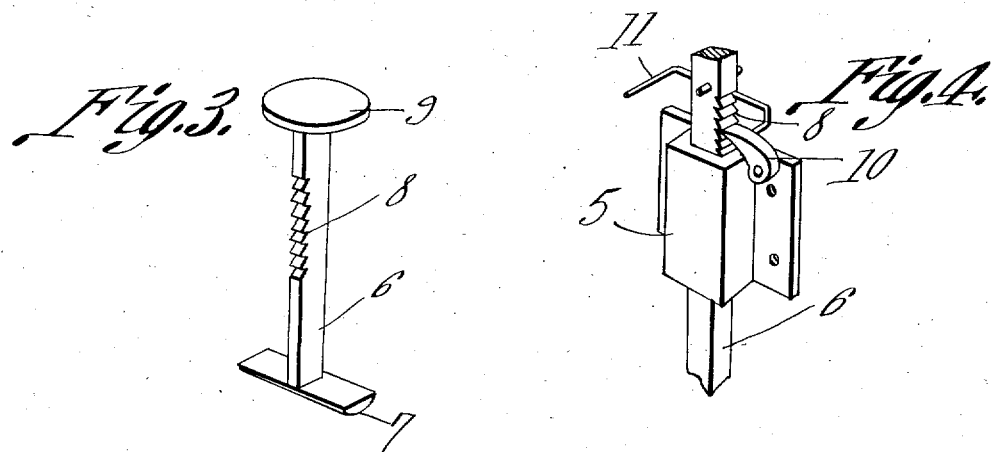
Witnesses
E. N. Botsford,
Inventor
by C. A. Snow & Co.
Attorneys

UNITED STATES PATENT OFFICE.

EUGENE N. BOTSFORD, OF PLATTEVILLE, WISCONSIN.

DERAILMENT AIR-BRAKE.

1,019,751.   Specification of Letters Patent.   Patented Mar. 12, 1912.

Application filed April 1, 1911. Serial No. 618,360.

*To all whom it may concern:*

Be it known that I, EUGENE N. BOTSFORD, a citizen of the United States, residing at Platteville, in the county of Grant and State of Wisconsin, have invented a new and useful Derailment Air-Brake, of which the following is a specification.

This invention relates to railway brakes, and more especially to those which are controlled by fluid pressure such as air; and the object of the same is to produce an improved device by means of which the air brakes are automatically set when the wheels of a truck become derailed. This object I accomplish by the construction hereinafter described and claimed, and shown in the drawings wherein—

Figure 1 is a side elevation of a six-wheel truck with my improvements mounted thereon, showing its connection with the air brake system. Fig. 2 is an end elevation of my device taken on a section line about at the point 2—2 of Fig. 1 and illustrating the same as employed at both sides of the car. Fig. 3 is a perspective detail of the plunger. Fig. 4 is a perspective detail of the guide with a portion of the plunger therein.

In the drawings the letter C designates a car, beneath which in this instance is a truck T carrying three pair of wheels W which travel on the rails R, and A is the main pipe of the air brake system having a relief valve at V, all these parts being of the usual or of any well known construction and forming no part of the present invention. It is well known that car bodies are mounted upon their trucks by means of interposed springs (not shown in this instance), and that in stopping and starting, in rounding curves, and on grades and under other conditions the car bodies sway from side to side and forward and backward to a considerable degree over and above the trucks as is permitted by the flexibility of the springs referred to. This relative movement of the body upon its running gear is enhanced and increased to a great degree when the wheels become derailed by reason of an open switch or spread rails or otherwise, and in the act of running off the rails the wheels take a very irregular and tortuous course because they have left the even and continuous rail-treads and are bumping around upon the ties or guard rails or switches as is well understood. In fact, the exigencies of the occasion and all collateral conditions of an accident are such as to upset human calculations and efforts directed with a view to meeting the unusual conditions which then prevail. As a result, my experience has taught me that on such occasions a safety brake shoe either does not strike the rail, or strikes it too late or in an improper direction; the plunger either does not work in its guides, or works improperly; and the connection between its head and the relief valve in the air brake system is disarranged to such an extent that, at the very moment when it becomes necessary to apply the air brake, the safety device fails to do so. All these objections I have sought to overcome by my present invention which I will now describe.

Carried by the truck T between two of the wheels W and on the inside of the truck where it will be guarded from accidental blows, is an upright rectangular guide 5 (best seen in Fig. 4) in which is mounted for vertical movement a rectangular plunger 6 having a shoe 7 secured across its lower end, ratchet teeth 8 in one edge of its body, and a rather large disk or weighted head 9 at its upper end. The shoe is by preference of considerable length relative to the width of the rail, as seen in Fig. 2, so that it extends across the same and for a good distance to each side of it in order that it shall strike upon the rail in case the wheel should leave the rail at either side thereof. A pawl 10 is pivoted to the guide and engages the teeth in the plunger, and a handle 11 of some considerable weight projects from this pawl to a point where it can be reached by an operator standing alongside the track. The purpose of the pawl is to hold the plunger after it has been raised, and the obvious purpose of the handle is to raise the pawl out of engagement with the teeth when it is desired to permit the plunger to descend again.

A long lever 15 is pivoted at 16 beneath the car body and has one extremity connected with the relief valve V in the air brake pipe A, its other extremity having a knob 18 which under normal conditions stands above the center of the head of the plunger. If the car has a heavy load its springs will be compressed and the knob will be depressed onto the head, but the entire plunger can be let down a little by manipulating the pawl. When rounding curves or crossing switches the car body may swing from side to side, as it swings forward and backward in stopping and starting, and all of these movements are permitted by the fact that the knob is not connected with the head in any way.

In the event of an accident the wheels become derailed, and in the act of running off the rails and certainly after they have left them and dropped down from four to five inches, the shoe strikes upon the rail and the plunger is forcibly raised within its guide. This causes the head to strike the knob on the lever, and the latter is turned on its pivot and its remote end opens the relief valve V so that the air brakes are automatically applied to the wheels and the car comes to a stop. When the wreckers arrive they can raise the pawl to release the plunger and permit the valve to close. Thereafter the car can be replaced upon the rails, any damage which has occurred may be repaired, and the interruption to traffic is at an end. As is well known to railroad men, it frequently happens that the last cars from the rear end of a freight train become detached, but by a wise provision in the air brake system the act of breaking away from the train causes the automatic application of the air brakes. But it often occurs that a single car may become derailed without the knowledge of the engineer, and yet the air brake system is not broken and the brakes are not applied. In this instance then my invention would be of great advantage, because it would not only automatically apply the air brakes to the derailed car and all others connected up with the system, but it would render it impossible for the engineer to take off the brakes without stopping the train to see what was the matter. The advantage which would result in the saving of freight and live stock, and the far greater advantage in the saving of human lives if the invention were applied to passenger trains, need not be elaborated upon yet.

What is claimed is:

The combination with a railway car and its air brake system, its wheels mounted in a truck, and the rails; of an upright guide carried by the truck between two of said wheels, a pawl pivoted thereto and having a weighted handle, an upright plunger movable through said guide and having ratchet teeth engaging the tip of said pawl, a shoe secured to the lower end of said plunger and extending across the rail, a flat weighted head secured to the upper end of said plunger, a relief valve in the air brake pipe, and a lever pivoted beneath the car body and connected at one extremity with said valve and having a knob at its other extremity resting upon said head.

In testimony that I claim the foregoing as my own, I have hereto affixed my signature in the presence of two witnesses.

EUGENE N. BOTSFORD.

Witnesses:
L. A. BRUNCKHORST,
S. J. FLYNN.

---

Copies of this patent may be obtained for five cents each, by addressing the "Commissioner of Patents, Washington, D. C."